(12) United States Patent
Walthert et al.

(10) Patent No.: US 10,933,940 B2
(45) Date of Patent: Mar. 2, 2021

(54) SHOCK DEVICE IN PARTICULAR FOR BICYCLES

(71) Applicant: DT SWISS INC., Grand Junction, CO (US)

(72) Inventors: Martin Walthert, Aarberg (CH); Karsten Richter, Biel (CH); Samuel Zbinden, Biel (CH)

(73) Assignee: DT SWISS INC., Grand Junction, CO (US)

( * ) Notice: Subject to any disclaimer, the term of this patent is extended or adjusted under 35 U.S.C. 154(b) by 427 days.

(21) Appl. No.: 15/980,550

(22) Filed: May 15, 2018

(65) Prior Publication Data

US 2018/0334219 A1 Nov. 22, 2018

(30) Foreign Application Priority Data

May 18, 2017 (DE) .......................... 102017110885.8

(51) Int. Cl.
*B62K 25/06* (2006.01)
*F16F 13/00* (2006.01)
(Continued)

(52) U.S. Cl.
CPC .............. *B62K 25/06* (2013.01); *B62K 25/08* (2013.01); *F16F 9/0209* (2013.01);
(Continued)

(58) Field of Classification Search
CPC .. B62K 25/06; B62K 25/08; B62K 2025/042; B62K 2025/048; F16F 13/005;
(Continued)

(56) References Cited

U.S. PATENT DOCUMENTS

| 3,171,643 A | 3/1965 | Roos |
| 4,623,132 A | 11/1986 | Smith |

(Continued)

FOREIGN PATENT DOCUMENTS

| DE | 967276 C | 10/1957 |
| DE | 102013109342 A1 | 3/2015 |
| DE | 102015115678 A1 | 3/2017 |

OTHER PUBLICATIONS

German Search Report for German Patent Application No. 10 2017 110 885.8, dated Jan. 3, 2018.
(Continued)

*Primary Examiner* — Kevin Hurley
*Assistant Examiner* — Harold Eric Pahlck, III
(74) *Attorney, Agent, or Firm* — Greer, Burns & Crain, Ltd.

(57) ABSTRACT

A shock device for an at least partially muscle-powered two-wheeled vehicle, including at least one tube system having two telescopic tubes, the tube system extending from a first end to a second end. A suspension system is provided which is effective between the two ends and which biases the two tubes to an extended position. The suspension system includes a positive air spring and an independent, series-connected supplementary spring. Both the positive air spring and the supplementary spring bias the tube system to the extended position. The supplementary spring shows a lower breakaway force than does the positive air spring, and the ratio of the suspension travel of the positive air spring to the suspension travel of the supplementary spring is higher than 4:1.

30 Claims, 8 Drawing Sheets

(51) Int. Cl.
   *F16F 9/02*    (2006.01)
   *B62K 25/08*   (2006.01)
   *F16F 9/512*   (2006.01)
   *B62K 25/04*   (2006.01)

(52) U.S. Cl.
   CPC ............ *F16F 9/0227* (2013.01); *F16F 9/512* (2013.01); *F16F 13/007* (2013.01); *B62K 2025/042* (2013.01); *B62K 2025/048* (2013.01)

(58) Field of Classification Search
   CPC ...... F16F 13/007; F16F 9/0209; F16F 9/0227; F16F 9/512
   See application file for complete search history.

(56) References Cited

U.S. PATENT DOCUMENTS

| | | | |
|---|---|---|---|
| 5,195,766 A * | 3/1993 | Dohrmann | B62K 25/08 280/276 |
| 5,860,665 A | 1/1999 | Giles | |
| 6,592,136 B2 * | 7/2003 | Becker | B62K 25/08 280/276 |
| 7,070,028 B2 | 7/2006 | Reybrouck et al. | |
| 7,270,211 B1 | 9/2007 | Jones | |
| 7,722,069 B2 * | 5/2010 | Shirai | B62K 25/08 280/276 |
| 9,132,881 B2 * | 9/2015 | Kwaterski | F16F 9/3228 |
| 9,630,679 B2 * | 4/2017 | Aoki | F16F 9/0281 |
| 9,975,597 B2 * | 5/2018 | Bossard | F16F 9/0209 |
| 10,099,743 B2 * | 10/2018 | Walthert | F16F 9/535 |
| 2004/0145101 A1 * | 7/2004 | Olds | B62K 25/08 267/64.28 |
| 2013/0313803 A1 | 11/2013 | Kwaterski | |

OTHER PUBLICATIONS

Extended European Search Report from corresponding European Patent Application No. 18172881.7, dated Oct. 9, 2018.

* cited by examiner

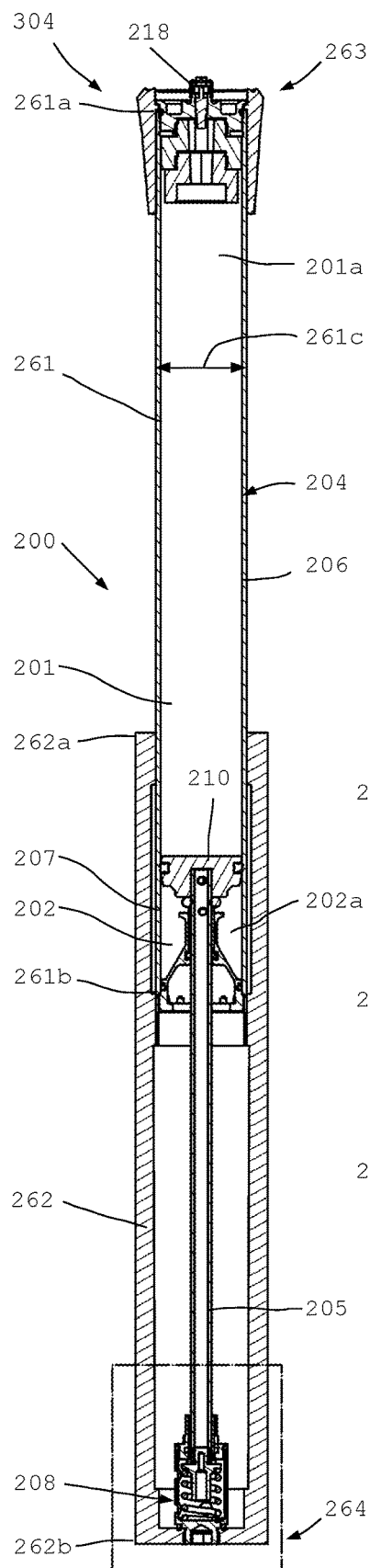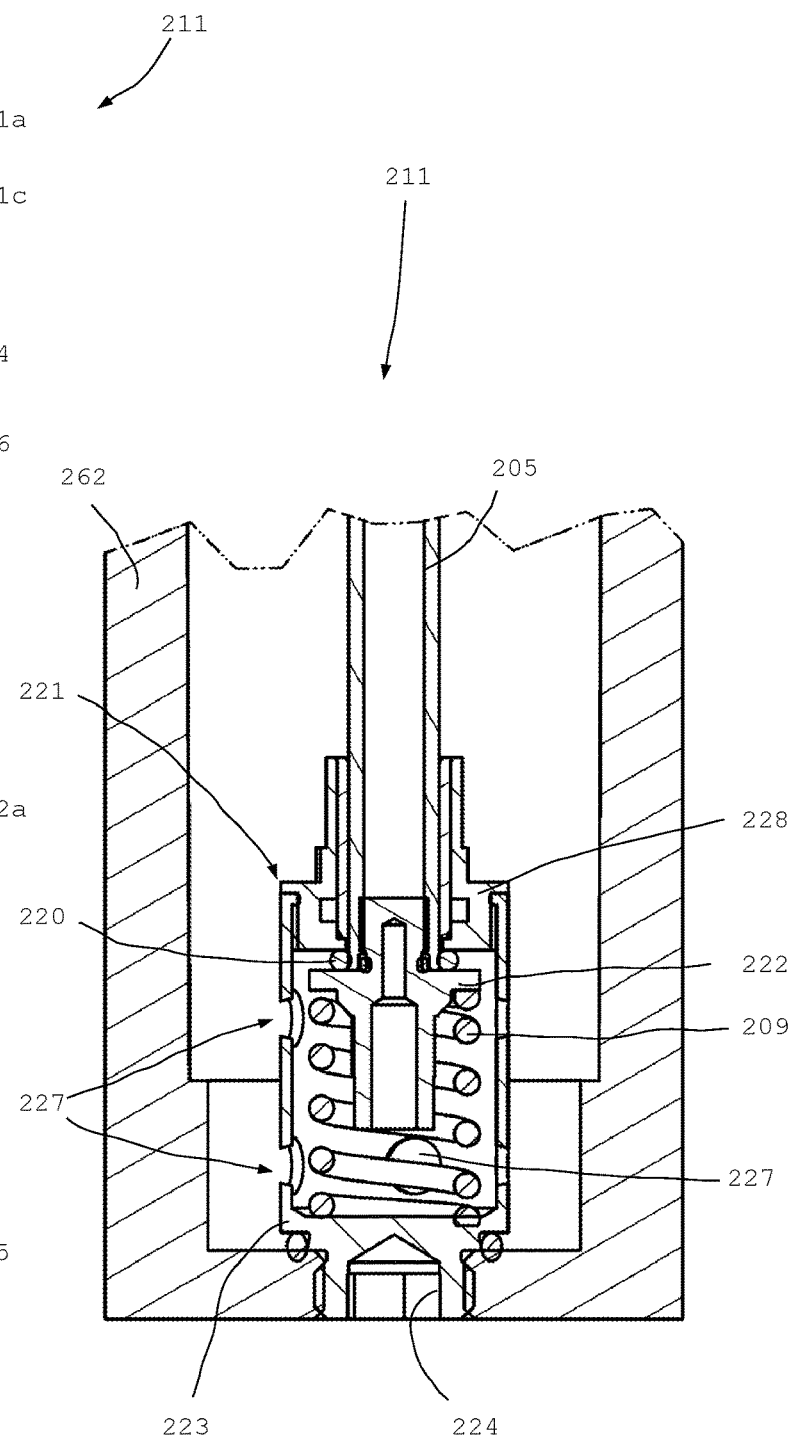
Fig. 7
Fig. 8

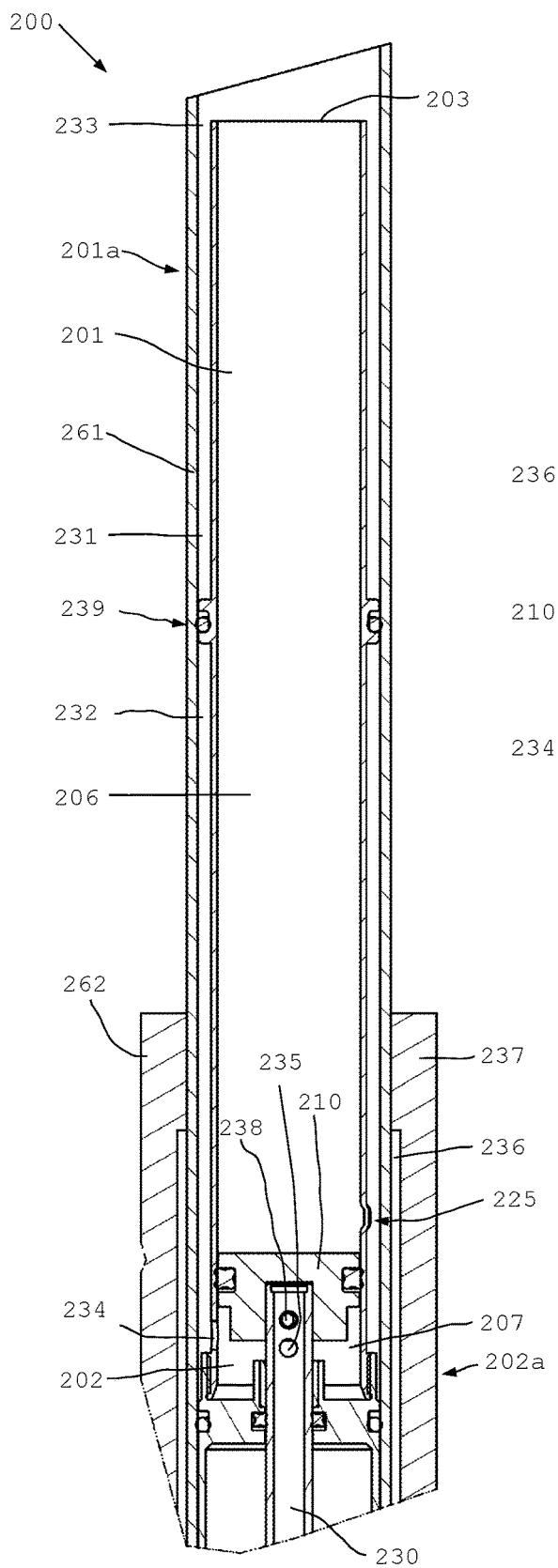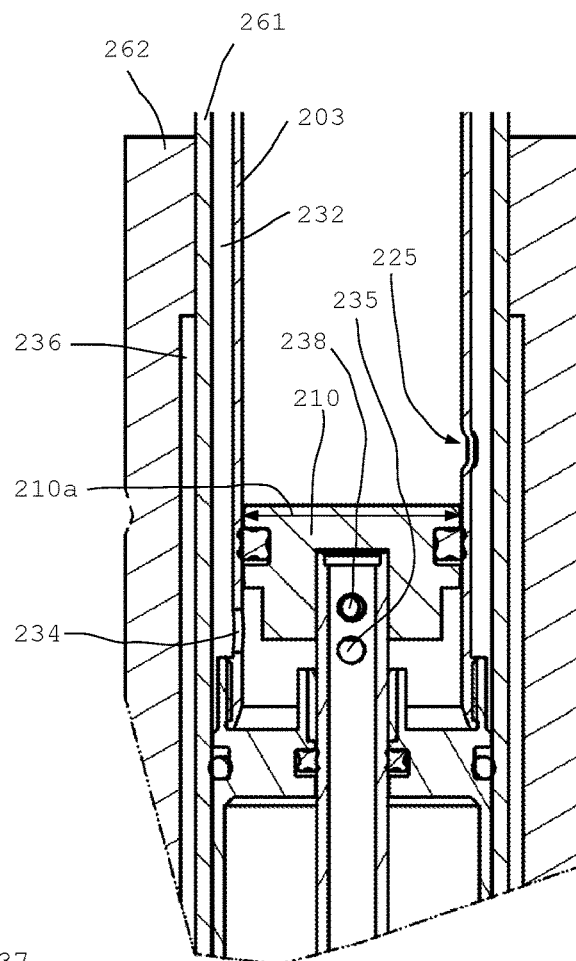
Fig. 11
Fig. 12

SHOCK DEVICE IN PARTICULAR FOR BICYCLES

BACKGROUND

The present invention relates to a shock device and in particular a shock absorber for an at least partially muscle-powered two-wheeled vehicle, and in particular a bicycle and comprises at least one tube system having two telescopic respectively telescoping tubes, the tube system extending from a first end to a second end. A suspension system is provided which is effective between the first and second ends and which biases the two tubes to an at least partially extended position.

The prior art has disclosed a great variety of shock absorbers for bicycles with and also without an electric auxiliary motor. The weight of at least partially muscle-powered bicycles plays a significant role, in particular where sports or competition bicycles are concerned. Ambitious amateurs also set great store by particularly lightweight bicycles. This includes in particular the field of mountainbikes. Weight reduction in bicycle components tends to involve significant work input.

Most mountainbikes come equipped with a suspension fork and a rear wheel shock absorber. The shock devices at the front and rear wheels serve to dampen shocks during riding in open terrain or downhill, thus increasing comfort. The safety in riding can be additionally increased since the bicycle wheels show improved traction.

In recent years, suspension forks for performance-oriented mountainbikes have been developed with a focus on two suspension types. These use either a simple coil spring or an air spring. A coil spring shows the advantage of linear spring characteristics and a minimum of friction since no seals are required. Its drawback is the relatively high weight since coil springs are as a rule made of metal. Another drawback is the complex adaptation of the spring force to riders of different weights. Thus, the entire coil spring needs to be exchanged if the weights differ too much between riders. The advantage of air suspension is the very low weight and the option of adapting the suspension hardness at will through a pressure valve. Its drawback is the increased friction due to the required sealing. A breakaway force must first be present before the air spring responds by compressing and rebounding. Moreover, the spring characteristics are not linear.

The prior art U.S. Pat. No. 5,195,766 discloses a suspension fork for bicycles comprising a main spring, which is a steel spring, and a supplementary gas spring. The steel spring and the gas spring are mounted in series. The gas spring can be filled up from outside so as to provide for adjustable pressure and variable damping characteristics of the suspension fork. The supplementary gas spring provides the suspension fork with top-out damping since increasing compression will increase the spring force of the gas spring, however, other gas springs also show such top-out damping. Although the known suspension fork is functional, its total weight is very high.

It is therefore the object of the present invention to provide a shock device for an at least partially muscle-powered bicycle, the shock device showing over the cited prior art at least one improved property and in particular improved responsivity while having a low total weight.

SUMMARY

A shock device according to the invention is provided for an at least partially muscle-powered two-wheeled vehicle and in particular a bicycle. The shock device comprises at least one tube system having two telescopic tubes, the tube system extending from a first end to a second end. A suspension system is provided which is effective between the two ends (first and second ends) and which biases the two tubes to a (/an at least partially) extended position. The suspension system comprises a positive air spring and an independent, series-connected supplementary spring. The positive air spring and also the supplementary spring bias the tube system to the (at least partially) extended position. The breakaway force of the supplementary spring is weaker than that of the positive air spring. The ratio of the suspension travel of the positive air spring to the suspension travel of the supplementary spring is higher than 4:1.

The extended position may, in particular be an entirely extended position or alternately it is a base position or else a sag position.

The shock device according to the invention has many advantages. A particular advantage of the shock device according to the invention consists in employing not only a positive air spring but also a supplementary spring which is connected in series. This means that both springs are effective concurrently.

Two different, series-connected springs provide a shock device that is even more advantageous overall. The shock device comprises (at least) one air spring for a positive spring and it can thus be manufactured showing a reduced total weight. Thus, the shock device is well suited to be employed in sports bicycles for amateurs and also for professionals. Furthermore, the inventive shock device comprises a supplementary spring which is series-connected with the air spring and which also biases the tube system to a, or the, extended position.

The supplementary spring may show a different suspension system configuration, thus offering considerable design options. Thus, the supplementary spring may show a low-friction configuration so that the inventive shock device shows for one, the advantages of an air spring and for another, delicate and low-friction responsivity. It is even possible to provide a suspension system whose breakaway force is zero, which will thus respond to the smallest load variations.

Another considerable advantage is the fact that the spring characteristics of the entire suspension system may be more linear in configuration. This improves the behavior of the shock device in operation. The supporting effect is improved, and a predictable behavior is achieved.

Preferred configurations provide for a shock device in the shape of a shock absorber. Thus, the term "shock device" may be more precisely called a "shock absorber" in the entire present application. This shock absorber may, in particular be provided for the front wheel or e.g. for the rear wheel. A shock absorber for the front wheel is also referred to as a suspension fork. A shock absorber for the rear wheel may also be referred to as a rear wheel shock absorber.

An "extended position" in the sense of the present application may also be understood to mean an at least partially extended position. Extended position may, though it does not need to, mean extended entirely, for example against a counterforce providing balance. "An extended position" also includes an entirely extended position.

In preferred configurations the shock device is configured as a suspension fork, one of the two tubes being configured as the stanchion tube and the other of the tubes, as a slider tube. It is preferred for the stanchion tube to be connected with the fork crown or the fork column and the slider tube, with a dropout.

A particularly preferred configuration provides for the shock device to be configured as a suspension fork and to be intended for an at least partially muscle-powered bicycle. The suspension fork comprises at least one tube system and an adjacent wheel receiving space. The tube system comprises two tubes, one of the tubes being configured as a stanchion tube and the other of the tubes, as a slider tube interacting therewith. The two tubes are telescopically coupled to one another. The tube system extends from a first end to a second end. A suspension system is provided and in particular integrated, being effective between the two ends and biasing the two tubes to a (further) extended position and for example to the state of rest. The suspension system comprises a positive air spring and a supplementary spring, both biasing the tube system to the, respectively an, extended position. Preferably the suspension fork shows two tube systems and in-between, the wheel receiving space.

In preferred specific embodiments, including all the configurations the positive air spring comprises a positive chamber in one of the two tubes. The positive chamber is in particular disposed in the first tube.

Preferably the positive chamber is enclosed in a moving piston connected with a piston rod. In particular, is the piston rod coupled with the second tube.

In preferred configurations, the supplementary spring is disposed between the piston rod and the second tube. The supplementary spring, in particular connects the piston rod with the second tube and particularly preferably with the second end of the tube system. This achieves a series connection of the positive air spring and the supplementary spring so as to have both the positive air spring and also the supplementary spring effective in the completely extended state and/or (but not solely) in the state of rest.

It is particularly preferred for the breakaway force of the supplementary spring to be weaker than that of the positive air spring. The breakaway force of the supplementary spring is preferably much weaker than the breakaway force of the positive air spring and in particular much weaker than the breakaway force of the entire suspension system (other than the breakaway force of the supplementary spring, which is preferably zero). Particularly preferably, the breakaway force is nearly zero or virtually zero or zero. The breakaway force must be distinguished from the operative force. In normal operation, or while a rider is sitting on the bicycle with the shock device in the sag position (or else any other position) the outer forces and the forces of the suspension system are balanced out (in the presently considered static case). In the case of a very low and preferably zero breakaway force, every weak or minute shock will cause a spring motion of the suspension system. If the supplementary spring is not already on block, every weak and minute shock will cause compression of the suspension system. Thereafter, however, the supplementary spring will as a rule join in rebound so that suspension travel of the supplementary spring may in turn be provided for weak and minute shocks until it is once again on block (compression completed). Forceful shocks generating a force exceeding the breakaway force of the positive air spring will compress the positive air spring and the supplementary spring, unless the supplementary spring is already on block. Thus, the suspension system responds to weak and minute shocks in many cases even if the force acting on the suspension system is weaker than is the breakaway force of the positive air spring.

Following road bumps or obstacles causing the shock device to compress, the suspension system will then rebound. Then, the supplementary spring and also the positive air spring will rebound if the force acting on the supplementary spring remains beneath the maximum force wherein hysteresis effects of the positive air spring and of the suspension system overall must be taken into account. This is why the supplementary spring may again provide suspension travel so that the following (even weak) shock causes the supplementary spring to respond, cushioning the shock. This is a frequent occurrence in real operation and even if the supplementary spring is actually completely compressed and thus on block already in the (static) sag position.

The prior art provides airsprung shock devices configured e.g. as suspension forks where the breakaway force for an air spring to overcome is about 20 Newtons. When a bicycle having such a known suspension fork is landing back on the ground following a jump or the like, an unsprung impact of 20 Newtons is firstly forwarded to the rider's hands. This is not particularly gentle and happens every time the bicycle falls back on the ground.

A shock device according to the invention configured as a suspension fork can cushion these shocks through the suspension system. The breakaway force of the supplementary spring over the breakaway force of the positive air spring is very weak and in particular zero.

The overall effective breakaway force of the air spring of the suspension system in the shock device does not only depend on the positive air spring but also on further components such as a negative spring, if one is provided. A damping system if any may also contribute to (and increase) the breakaway force.

The breakaway force of the suspension system is determined by the smallest acting breakaway force. When the breakaway force of the supplementary spring (preferably 0) is exceeded, the suspension system compresses (or rebounds), even if the positive air spring should not yet respond.

It is particularly preferred for the friction of the supplementary spring to be weaker than that of the positive air spring. Particularly preferably, the supplementary spring shows linear spring characteristics. In particular, are the spring characteristics of the supplementary spring linear at least over a substantial range of the supplementary spring stroke length.

In particular, does the supplementary spring comprise at least one spring member such as a coil spring. The spring member is in particular metallic. It is also possible to use a helical spring or a coil spring or a disc spring. It is also possible for the supplementary spring to consist of, or comprise, an elastic material such as rubber. Use of a coil spring or at least one coil spring is particularly preferred.

In preferred specific embodiments the stroke length of the supplementary spring is less than a (an inner or outer) diameter of at least one of the tubes of the tube system. In particular, is the stroke length of the supplementary spring less than half of the (inner or outer) diameter of the first tube or of the stanchion tube. Preferably, the stroke length of the supplementary spring is less than 60 mm, in particular less than 50 mm and particularly preferably less than 40 mm. The stroke length may for example be 6 mm, 8 mm, 10 mm, 12 mm, 14 mm or 16 mm or more. Particularly preferably, the stroke length of the supplementary spring is less than one tenth of the stroke length of the air spring.

Preferably, the spring constant of the supplementary spring lies between (approximately) 10 N/mm and 50 N/mm. In a concrete configuration a spring constant of the supplementary spring of 28 N/mm (+/−10% or +/−6 N/mm), given a suspension travel of 8 mm or 10 mm (+/−2 mm), has been found to be advantageous. In fact, the supplementary spring is then effective over a suspension travel of the suspension system of approximately 15 mm-50 mm.

It is preferred to choose the suspension travel and the spring constant of the supplementary spring so as to obtain a gentle transition in the spring characteristics. An elastic limit stop at the supplementary spring may contribute to a gentle and continuous transition.

In preferred specific embodiments, the supplementary spring comprises top-out damping. This top-out damping may be provided for example by an elastic ring such as an O ring or an X-ring or other elastic ring type. Such an elastic ring may be provided at two ends of the supplementary spring. In particular, at least one elastic ring is provided which effects top-out damping in rebound.

Preferably, the ratio of the spring force of the supplementary spring to the spring force of the positive air spring in a sag position is lower than 4:1 and preferably higher than 1:4.

Preferably, the ratio of the spring force of the supplementary spring to the spring force of the positive air spring, relative to the maximum stroke length of the supplementary spring, is lower than 20:10 and higher than 1:10. In particular, is the ratio of the spring force of the supplementary spring to the spring force of the positive air spring, relative to the maximum stroke length of the supplementary spring, lower than 15:10 and higher than 2:10.

In particular, is the ratio of the spring force of the supplementary spring to the spring force of the positive air spring, relative to the maximum stroke length of the supplementary spring, lower than 3:4 and higher than 1:4. This applies in particular to the recommended air pressure setting for a medium heavy rider weighing 80 kg or 90 kg.

In particular, is the ratio of the stroke length of the positive air spring to the suspension travel of the supplementary spring higher than or equal to the ratio of the volume of the positive chamber to the volume of the negative chamber in the extended position.

Preferably, the ratio of the volume of the positive chamber to the volume of the negative chamber in the extended position is higher than 1.6 and preferably lower than 15:1 and in particular lower than 10:1. In advantageous embodiments, the ratio of the volume of the positive chamber to the volume of the negative chamber in the extended position lies between 4:1 and 12:1 and preferably between 6:1 and 8:1.

It is most interesting and advantageous to design the ratio of the stroke length of the supplementary spring to the ratio between the volumes of the positive and negative chambers of the positive air spring so as to achieve highly linear final spring characteristics of the shock device and in particular of the suspension fork. This is achieved by way of the parameters indicated above.

For compensating conceivable drawbacks of an air suspension having positive and negative chambers of an air spring, the ratio of the positive to the negative volume in the extended state is selected to be 1.6 or higher than 1.6. Then, it is advantageous to select the supplementary spring so that the ratio of the total stroke length of the shock device or suspension fork to the stroke length of the supplementary spring is higher than 1.6.

In concrete configurations, the ratio of the volumes of the positive chamber to the negative chamber is higher than 1.6. The ratio of the entire stroke length to the stroke length of the supplementary spring, given a total stroke length of e.g. 130 mm, is higher than 4:1 and in particular higher than 8:1 and preferably higher than 12:1 and it may reach and exceed 15:1. Preferably, the ratio is lower than 35:1 and in particular lower than 30:1. Preferably the ratio is approximately 16:1 with a total stroke length of e.g. 130 mm.

Given a total stroke length of e.g. 170 mm, the ratio of the entire stroke length to the stroke length of the supplementary spring may be higher than 4:1, and in particular higher than 8:1 and preferably higher than 12:1, and it may reach and exceed 15:1 and 20:1. Preferably, the ratio is lower than 35:1 and in particular lower than 30:1. Preferably, the ratio is approximately 21:1 given a total stroke length of e.g. 170 mm.

Particularly preferably, the ratio of the entire stroke length to the stroke length of the supplementary spring (independently of the entire stroke length) lies between 10:1 and 25:1.

In all the configurations, it is preferred for the supplementary spring to be adjustable and/or exchangeable. It is possible for the stroke length of the supplementary spring to be adjustable. It is likewise preferred for the spring force of the supplementary spring to be adjustable. It is also possible that instead of one supplementary spring, two or more supplementary springs may be employed for example to increase spring rigidity.

In all the configurations, it is preferred to accommodate the supplementary spring in a guide housing. The guide housing may be adjustable and/or exchangeable. Simple configurations thus provide for using a supplementary spring having different spring characteristics by means of exchanging the guide housing. The guide housing may be provided with two ends with joints for attaching the guide housing to the second tube respectively the piston rod to be (readily) exchangeable.

Preferably, the first tube includes a negative spring which exerts a force counteracting the positive air spring. In this sense, the negative spring biases the tube system to a retracted state. Particularly preferably, the force of the positive air spring is higher than the force of the negative spring so that the force acting overall biases the tube system to the extended position.

Particularly preferably, the negative spring is configured as an air spring. The movable piston divides the volume in the first tube, preferably variably, into a positive volume of the positive spring and a negative volume of the negative spring. Then, when the piston rod emerges the positive volume of the positive spring is enlarged while the negative volume of the negative spring is correspondingly reduced.

In all the configurations, it is preferred to provide at least one bypass for ensuring pressure compensation between the positive air spring and the negative spring in a predetermined piston position. This achieves advantageous spring characteristics. Moreover, it is sufficient in these configurations to subject the positive air spring to the desired pressure. In the predetermined piston position, the pressure between the positive air spring and the negative spring is compensated so that the positive air spring and the negative spring show (virtually permanently) a suitable pressure relationship.

In all the configurations, it is possible to provide a top-out spring which is in particular effective over less than the initial third of the suspension travel. Particularly preferably, the top-out spring is effective over less than 50 mm, 30 mm or 10 mm and in particular less than 5 mm in the initial third of suspension travel. The top-out spring is in particular effective in full rebound. Preferably, the top-out spring surrounds the piston rod, being effective between the piston and the second end of the first tube. The first end of the first tube corresponds to the first end of the tube system, and the second end of the second tube corresponds to the second end of the tube system.

All the configurations particularly preferably comprise at least one damping system. It is preferred for damping to be active over the entire suspension travel.

Preferably, at least part of the damping system is disposed in a second tube system. The damping system may partially or preferably entirely be accommodated or fastened or formed in the second tube system. Alternately, it is possible for a first part of the damping system to be located in the first tube system and a second part of the damping system, in the second tube system. Alternately, it is possible for at least part of the damping system to be located external of the tube system.

In all the configurations, it is preferred for the first tube of the suspension system to accommodate a cylinder device in which the piston is movably accommodated. This means that the piston does not glide on the inside of the first tube but along the inside of the cylinder device. Thus, the piston surface is smaller than the first tube cross-section.

Preferably, at least sections of the cylinder device are surrounded by an additional hollow space which contributes to the volume of the positive air chamber as does the volume of the positive chamber of the cylinder device. This means that the pressure increase during compression of the positive air chamber is lower than it is without the additional hollow space. Thus, the linearization of the spring characteristics is even more improved.

Preferably, at least sections of the cylinder device are surrounded by a further hollow space which contributes to the volume of the negative air chamber as does the volume of the negative chamber of the cylinder device. Again, the outline of the spring characteristics is linearized.

Preferably, the cylinder device is firmly connected with the first tube. Flow apertures toward the additional hollow space and toward the further hollow space are provided.

These flow apertures provide for unimpeded air exchange or gas exchange between the additional hollow space and the positive chamber and between the further hollow space and the negative chamber.

Preferably, the additional hollow space and the further hollow space are disposed axially adjacent. Particularly preferably, the additional hollow space and the further hollow space are separated from one another by structural measures and/or at least one seal.

Another shock device according to the invention is provided for use with an at least partially muscle-powered two-wheeled vehicle, and in particular a bicycle. The shock device comprises at least one tube system having two telescopic or telescoping tubes, the tube system extending from a first end to a second end. A suspension system is provided which is effective between the two ends namely, the first and second ends, of the tube system and which biases the two tubes to an (at least partially) extended position. The suspension system comprises at least one gas spring comprising an air volume. The suspension system comprises a cylinder device in one of the tubes. The gas spring comprises an air chamber configured in the interior of the cylinder device and enclosed by a moving piston. The air chamber is connected with a hollow space formed external of the cylinder device and contributing to the volume of the gas spring as is the air chamber (in the interior of the cylinder device).

This shock device may furthermore comprise a (another) feature or all of the features of the configuration described above. This shock device may again be provided with a supplementary spring.

This shock device according to the invention also shows many advantages. This shock device enables better linearization of the spring characteristics. The hollow space increases the pertaining air chamber so that the piston compressing or rebounding will no longer significantly influence the pressure curve in the air chamber. This shock device again allows the more precise term of shock absorber.

Preferably, the cylinder device is (immediately) surrounded at least in sections by at least one hollow space which contributes to the volume of the gas spring as does the air chamber in the interior of the cylinder device.

Preferably, the gas spring comprises an air chamber configured in the interior of the cylinder device which is enclosed by a moving piston disposed in the interior of the cylinder device.

It is possible for the shock device to comprise (at least) two air springs namely, a positive air spring and/or a negative spring respectively negative air spring. The two air springs may each comprise (at least) one pertaining hollow space.

Preferably, the cylinder device is firmly connected with the first tube. The cylinder device is in particular surrounded by an additional hollow space and/or a further hollow space.

The cylinder device is particularly preferably firmly connected with the first tube and comprises flow apertures toward the additional hollow space and toward the further hollow space.

In all the configurations, a shock device according to the invention shows advantageous properties. A supplementary spring in the shape of an elastic member which compresses progressively in the first phase of suspension travel until it is on block, can provide for clearly more linear spring characteristics in the first phase. In this phase, the suspension system friction may decrease overall since the elastic member or the supplementary spring may move at low friction or frictionless, until the friction of the piston rod seals and piston seals is overcome.

This shock device may be combined with an inserted cylinder device. In the case of a cylinder device inserted in the first tube, a double tube is (virtually) used which enables improved spring characteristics. This allows the manufacture of a very sensitive suspension fork. During spring motion, the damping system remains active while the supplementary spring compresses and rebounds so as to maintain controllability of the suspension fork.

In advantageous configurations, the piston rod is retained in the pulling direction via the supplementary spring or via a further, additional member or via the damping side so that the top unit cannot separate from the bottom unit.

Preferably, the supplementary spring is compressed completely before the suspension fork reaches the nominal suspension travel. Alternately, it is possible for the supplementary spring to be less than completely compressed before the nominal suspension travel is reached.

In the case of a sag position of e.g. 25% or 30%, it is possible for the supplementary spring to already be compressed completely (on block).

Preferably, the additional hollow space and the positive chamber are received completely within the first tube. Preferably, the further hollow space and the negative chamber are received completely within the first tube. Preferably, the cylinder device is received completely within the first tube.

The applicant reserves the right to claim a shock device as described above, not only for use in at least partially muscle-powered two-wheeled vehicles but also to extend the claim generally to shock devices and in particular shock absorbers. Thus, such a shock device may be used in motor vehicles, motorcycles, or other machines and devices.

Using a cylinder device which results in the configuration of a double tube allows free choice of the pertaining volumes of the positive air spring and the negative spring within broad ranges. It is advantageous for the size of each volume to vary as little as possible between the volume of a suspension fork in full rebound and the volume of a completely compressed suspension fork. The space available in the interior of a suspension fork is, however, subject to restrictions due to the fitted dimensions and the tube diameters. Using an inner tube or a cylinder device within which the piston is guided will not increase the actual volume provided in the suspension fork. However, using a smaller piston displacing a smaller volume reduces volume variations between the rebound and compression states and thus allows increased linearity of the characteristic curves.

Further advantages and features of the present invention can be taken from the exemplary embodiments which will be described below with reference to the enclosed figures.

BRIEF DESCRIPTION OF THE DRAWINGS

The figures show in:
FIG. 7 a cross-section of the other leg of the suspension fork in rebound;
FIG. 8 an enlarged detail of FIG. 7;
FIG. 11 a further suspension system for the suspension fork of FIG. 2;
and
FIG. 12 an enlarged detail of FIG. 11.

DETAILED DESCRIPTION

Figure 1:
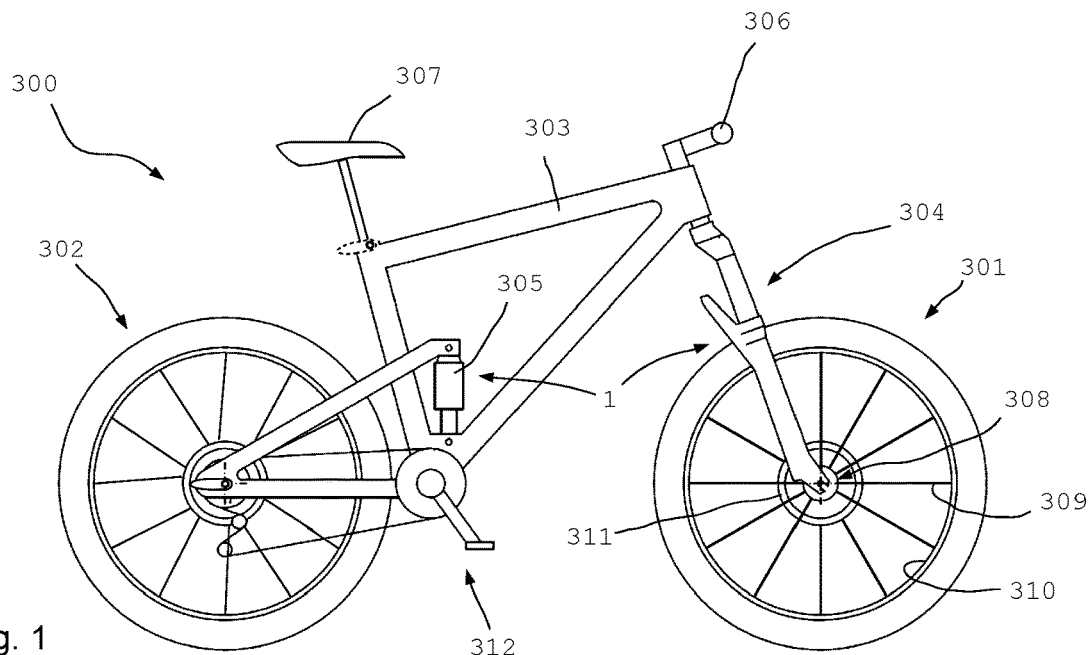
FIG. 1 a schematic side view of a mountain bike.

FIG. 1 shows a schematic illustration of a mountainbike representing the bicycle or two-wheeled vehicle 300. The bicycle may be provided with an electric auxiliary drive. The bicycle comprises a front wheel 301, a rear wheel 302, a frame 303, two shock devices 1 acting as shock absorbers namely, a suspension fork 304 and a rear wheel damper 305, a handlebar 306 and a saddle 307. The drive 312 is provided by pedals and presently, a chain-shifting device or derailleur. Disk brakes 311 may be provided. The front wheel 301 and the rear wheel 302 are each fastened to the fork 304 respectively the frame 303 by way of a quick release device. Each of the wheels comprises spokes 309 and a rim 310 as well as a hub 308. This mountainbike 300 comprises two shock absorbers 1 namely, the suspension fork 304 and the rear wheel shock absorber 305.

Figure 2:
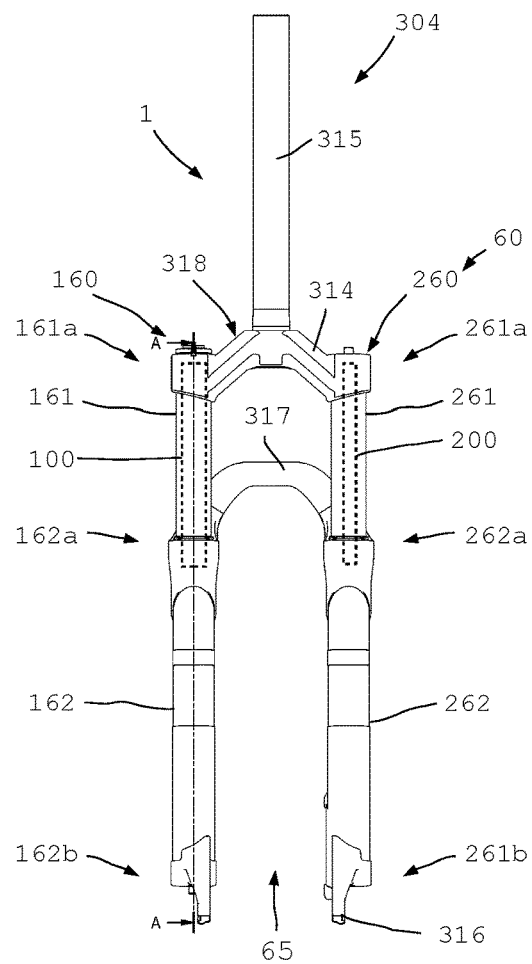
FIG. 2 a front view of the suspension fork of the mountainbike of FIG. 1.

FIG. 2 shows a front view of the suspension fork 304 of the mountainbike 300 of FIG. 1. The suspension fork 304 comprises a fork column 315 connected with the top unit 318. The top unit 318 further comprises the fork crown 314 and the stanchion tubes 161 and 261. The top unit 318 cooperates with the bottom unit 317 which comprises the slider tubes 162 and 262. The lower ends 162b, 262b of the slider tubes 162 and 262 are each provided with a dropout 316. The top ends 161a and 261a of the stanchion tubes 161 and 261 are provided with the fork crown 314 (see FIG. 7). The top ends 162a and 262a of the slider tubes 162 and 262 surround the bottom ends 161b and 261b of the stanchion tubes 161 and 261. The wheel receiving space 65 is configured between the tube systems 160 and 260.

This suspension fork 304 comprises two tube systems 60 namely, the tube system 160 accommodating the damping system 100, and the tube system 260 accommodating the suspension system 200.

Figure 3:
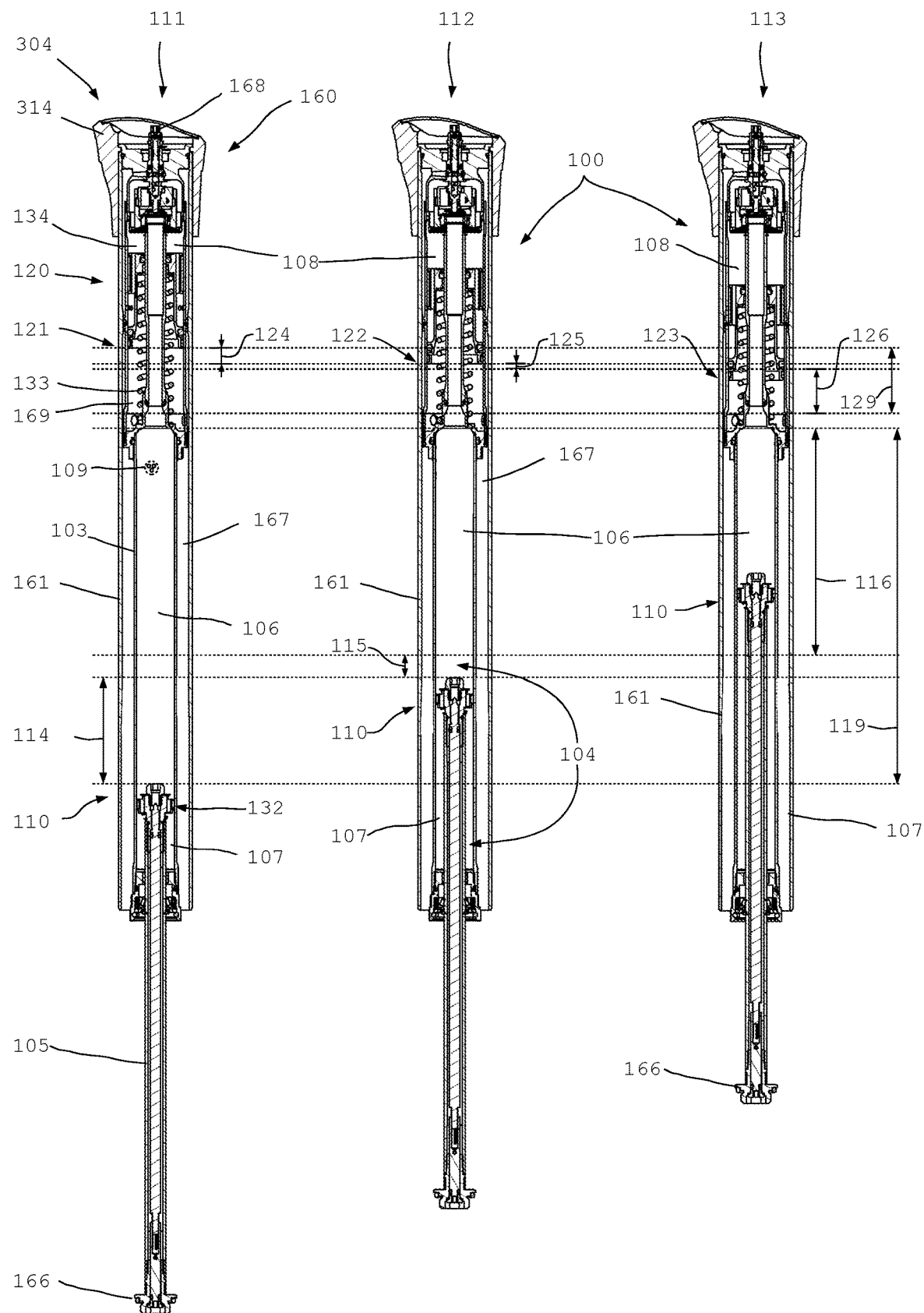
FIG. 3 a schematic cross-section of three degrees of compressed positions of the suspension fork of FIG. 2.

FIG. 3 shows in adjacent schematic cross-sections three illustrations of the tube system 160. FIG. 3 shows on the left the tube system 160 in the base position 111 or an initial position while in the center the tube system 160 is illustrated in a transition position 112 and on the right, in a further plunged-in position 113.

The fork crowns 314 can be recognized at the top ends of the tube systems 160. The top end of the tube system 160 shows an operating member 168 for setting and adjusting the damping characteristics.

The tube system 160 comprises a stanchion tube 161 and the slider tube 162 (not shown) surrounding the piston rod 105 when mounted.

A damper cylinder 103 is firmly received in the interior of the stanchion tube 161. The piston or damper piston 110 divides the damping volume 104 variably into a first damping chamber 106 and a second damping chamber 107. In the piston 110 a throttle unit 132 is disposed for damping the transition of the damping fluid 109 from the first damping chamber 106 into the second damping chamber 107 and reversely.

As the piston rod 105 enters the damper cylinder 103, a part of the volume of the piston rod 105 likewise enters the damper cylinder 103. The corresponding volume of the piston rod 105 must be displaced out of the damper cylinder 103 and exits upwardly out of the damper cylinder 103 and is conveyed into the auxiliary chamber 108.

The auxiliary chamber 108 is subdivided by a dividing piston 120, providing an equalizing volume 134. The dividing piston 120 is biased by a biasing device 133.

In the position illustrated on the left in FIG. 3 the suspension fork 304 or the damping system 100 is in the base position 111, which may be the maximum rebound position or else e.g. corresponds to the sag position which is achieved as the rider mounts the bicycle at standstill.

The bottom end of the piston rod 105 has a bottom connector 166 for connecting with the slider tube, not shown in FIG. 3. A hollow space 167 (filled with air as a rule) is configured radially between the outer wall of the damper cylinder 103 and the inner wall of the stanchion tube 161.

Above the damper cylinder 103 there is a hollow space 169 in which the biasing device 133 biasing the dividing piston 120 is disposed. Presently a coil spring 133 acting as the biasing device is illustrated. It is also possible that the hollow space 169 serves as (a supplementary or the sole) air spring and thus as a biasing device 133 for biasing the dividing piston 120.

The center of FIG. 3 illustrates the tube system 160 of the suspension fork 304 in the transition position 112. In this transition position 112, the piston 110 has plunged further into the damper cylinder 103. Accordingly, the dividing piston 120 has shifted from the base position 121 to the transition position 122. The dividing piston has traveled over a first travel distance 124 while the piston 110 has traveled over a first travel distance 114. The travel distances 114 and 124 are proportional relative to one another. This piston 110 reaches the transition section 115 and the dividing piston 120, the transition section 125 in which the dividing piston 120 starts closing an aperture 138 (or multiple apertures 138 distributed over the circumference).

The damper cylinder 103 comprises a damping volume 104 formed by the first damping chamber 106 and the second damping chamber 107.

As the tube system 160 continues compressing, it will ultimately show the position illustrated in FIG. 3 on the right where the tube system 160 and thus the piston 110 are located in a further plunged-in position 113. This plunged-in position 113 is located in the second travel distance 116 between the transition section and the end position. The second travel distance 116 preferably extends over more than half the piston stroke 119. Preferably, the length of the first travel distance 114 is between one fifth and two fifths relative to the piston stroke 119. In preferred embodiments, the proportion of the first travel distance is approximately one third (+/−10%) of the piston stroke 119.

In other configurations, the length of the first travel distance 114 may be up to half or as much as 60% of the piston stroke 119 (or more). Then, the second travel distance is correspondingly shortened to 30% or 40% and the transition section extends over the distance remaining between.

The piston 110 is located in the illustration on the right in FIG. 3 in the plunged-in position 113. Accordingly, the dividing piston 120 has taken a plunged-in position 123 and is located in the second travel distance 126. The dividing piston 120 can travel over one piston stroke 129.

Figure 4:
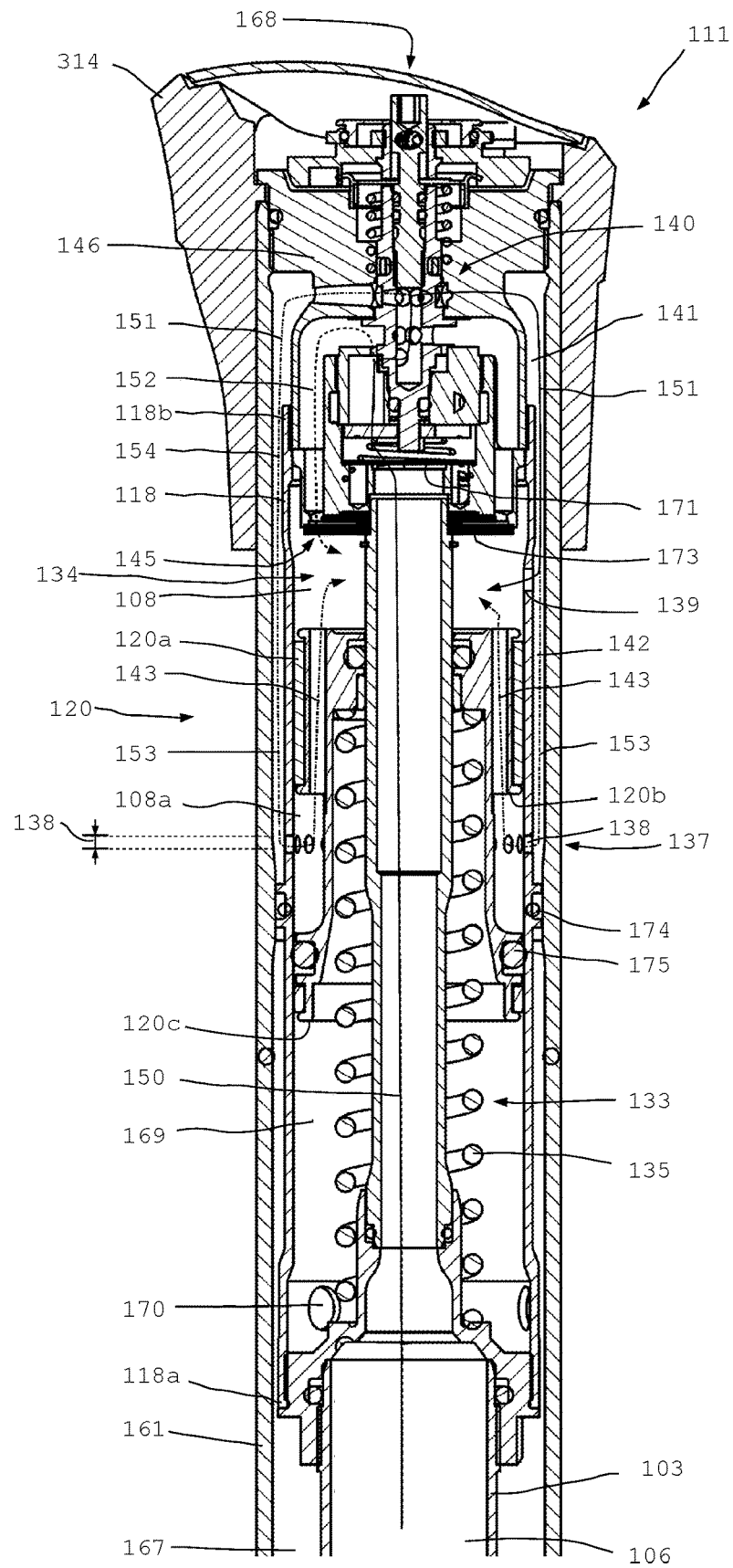
FIG. 4 an enlarged detail of FIG. 3 in the base position.

FIG. 4 shows an enlarged detail from the illustration on the left in FIG. 3. The top part of the tube system 160 is shown with the fork crown 314 recognizable in section at the top end. The damping can be set and adjusted by way of the operating member 168.

The biasing device 133 is disposed above the damper cylinder 103 and it may comprise a steel spring 135 and/or a gas spring 136 for biasing the dividing piston 120 upwardly. The dividing piston separates the auxiliary chamber 108. The dividing piston 120 shows a low-friction bushing 120a on the outer circumference. While the biasing device 133 presses the dividing piston 120 upwardly in a central region of the dividing piston, a part 108a of the auxiliary chamber 108 is located radially outwardly of the dividing piston 120 and another part, above the dividing piston 120.

The damper cylinder 103 is mounted in the stanchion tube 161 so that a radial void or hollow space 167 forms.

In the exemplary embodiment, an insert 118 is placed on the top end of the damper cylinder 103. The bottom end 118a of the insert 118 may for example be screwed to the cap of the damper cylinder 103. The insert 118 is sealed via at least one seal 174 against the inner surface of the stanchion tube 161. Above the seal 174, which in the illustration of FIG. 4 is located approximately at the height of the seal 175 of the dividing piston 120, a radial gap 154 is formed between the insert 118 and the wall of the stanchion tube 161 which is used for transporting damping fluid in the auxiliary chamber 108.

The insert 118 shows at least two radial holes (rows of holes or series of holes) or apertures 138 and 139. The apertures 138 and 139 are disposed offset in the axial direction of the insert 118. In this illustration according to FIG. 4, the apertures 138, the majority of which is distributed over the circumference of the insert 118, are located between the bottom end 120b of the low-friction bushing 120a and the sealing 175 at the bottom end 120c of the dividing piston 120. Above the apertures 139 a (first) duct 141 is formed in the clearance between the insert 118 and the inner wall of the stanchion tube 161. Beneath the apertures 138 a (second) duct 142 is formed up to the apertures 139 in the clearance between the insert 118 and the inner wall of the stanchion tube 161.

The apertures 139, one aperture 139 of which is exemplarily shown in FIG. 4, are configured above the top end of the dividing piston 120 in the radial wall of the insert 118.

The apertures 138 form a valve 137 for the damping fluid 109 to flow from the duct 142 into the auxiliary chamber 108. The aperture 139 or the apertures 139 likewise form a valve for the damping fluid 109 to flow from the duct 141 into the auxiliary chamber 108.

A control insert 146 is fed into the insert 118 at the top end 118b of the insert 118 so that the bottom end 118a of the insert is connected with the damper cylinder 103 and the top end 118b of the insert 118, with the control insert 146.

In the exemplary embodiment, the radial hollow space 167 between the damper cylinder 103 and the stanchion tube 161 is connected through apertures 170 with the hollow space 169 which accommodates the biasing device 133 for the dividing piston 120. It is also possible to use a gas spring 136 for biasing the dividing piston 120. Then, the apertures 170 are normally closed or entirely absent.

In compressing, damping fluid 109 flows upwardly through the central duct along the flow path 150 into the control insert 146. In the case of weak shocks, only the throttle 140 for low speed will open and in the rebound position illustrated in FIG. 4, the damping fluid can enter along the flow path 151 into the radial gap 154 between the insert 118 and the inner wall of the stanchion tube 161.

The damping fluid can, starting from the radial gap 154 in the further rebounded position 111 (e.g. the base position 111) illustrated in FIG. 4, enter through the apertures 138 and 139 into the auxiliary chamber 108. The apertures 138 and 139 overall provide a large flow cross-section so that the compressing operation in the compression stage is only slightly damped in the base position 111 shown. The flow path 151 through the apertures 139 is indicated at the solid-line arrow. The flow path 153 through the apertures 138 is shown at the broken-line arrow 153. The flow path firstly runs along the flow path 151 into the radial gap 154. Part of the damping fluid 109 immediately transfers into the auxiliary chamber 108 through the apertures 139. Another part flows along the radial gap 154 further through the second duct 142 up to the apertures 138, which run toward the chamber section 108a of the auxiliary chamber 108. The damping fluid 109 now in the chamber section 108a may then be guided radially inwardly through the feedback channel 143 from the bushing 120a upwardly into the main portion of the auxiliary chamber 108.

The two active apertures 138 and 139 obtain a low damping rate in the range of low flow rates (low speed) in the compression stage so as to provide soft responsivity.

For forceful shocks, the flow path 152 for high speeds (high speed) is additionally opened by way of the throttle 145. The flow path 152 is shown at the broken-line arrow. In the case of forceful shocks, the shim valve 173 opens so that the flow path 152 is also available for effective transfer of damping fluid 109 into the auxiliary chamber 108.

In the rebound stage, the biased one-way valve 171 allows return flow of the damping fluid 109 (in particular oil).

In the base position 111 illustrated in FIG. 4, weak damping is provided for weak shocks. For forceful shocks, the damping provided is accordingly stronger.

Figure 5:
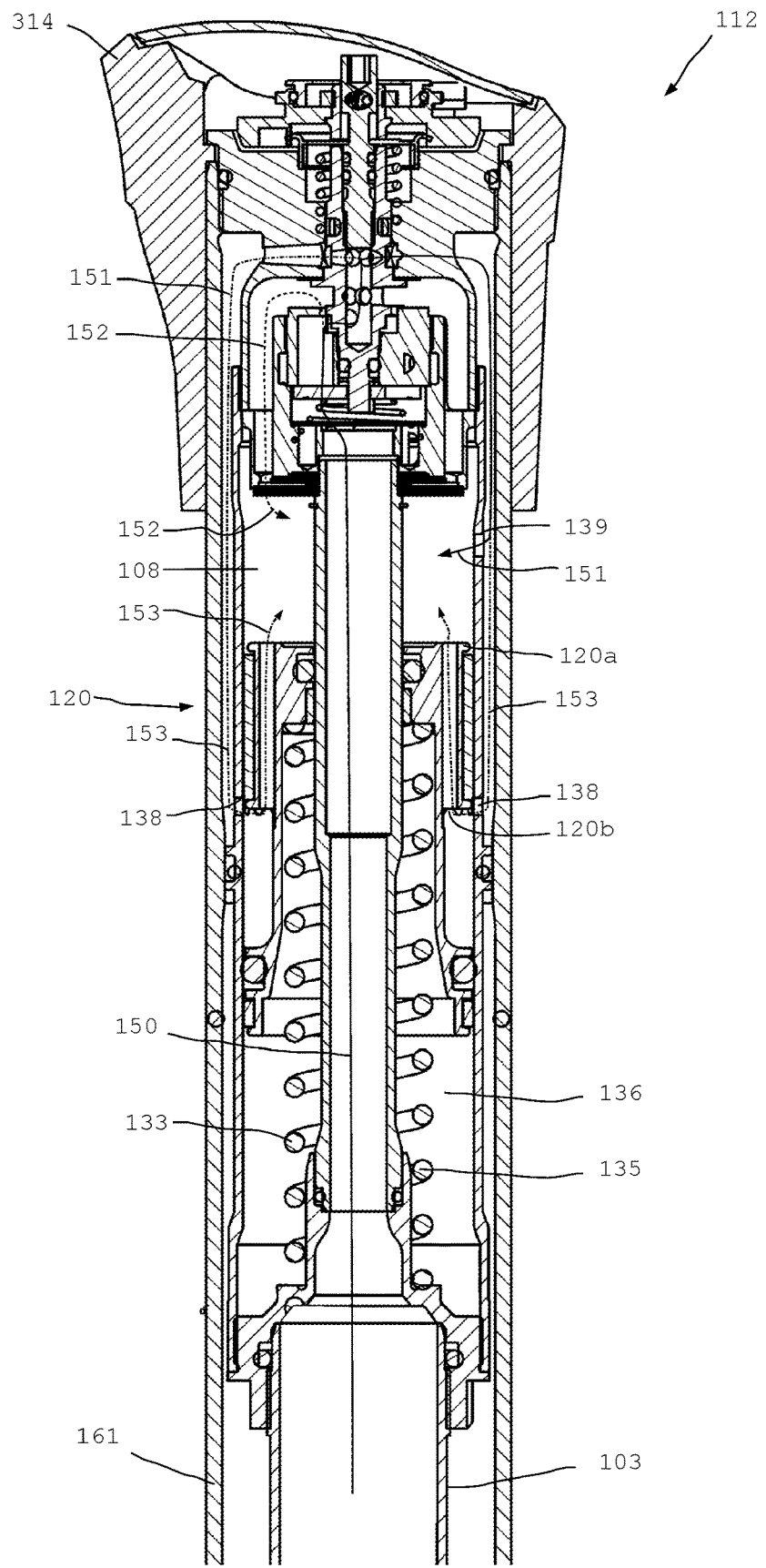
FIG. 5 an enlarged detail of FIG. 3 in the transition position.

FIG. 5 shows an enlarged region of the stanchion tube 161 of the suspension fork 304 in a transition position 112 in which the suspension fork is compressed further. Due to the piston rod 105 plunging into the damper cylinder 103, a certain quantity of damping fluid 109 has been displaced into the auxiliary chamber 108 so that the dividing piston 120 has correspondingly shifted downwardly. Thus, the bottom end 120b of the bushing 120a shifts downwardly as well until the end 120b in the position shown in FIG. 5 ultimately begins to close the apertures 138 partially and finally completely. The transition section 115 of the piston 110 and the pertaining transition section 125 of the dividing piston 120 begin respectively extend in this region. Thus, the flow path 153 shown in broken lines for the damping fluid 109 is closed partially and finally completely. At the end of the transition section 125, the flow path 153 is completely closed by way of the apertures 138.

For damping at low piston speeds only, the flow path 151 through the aperture 139 out of the radial gap 154 into the auxiliary chamber 108 is available from the end of the transition section 115 of the piston 110 respectively the suspension fork or the transition section 125 of the dividing piston 120 formed thereby. In the case of forceful shocks, the high speed valve will open additionally and the flow path 152 will open (shown in broken lines).

In a concrete embodiment, the entire piston stroke 119 measures approximately 160 mm. The length of the first travel distance 114 without the transition section is 50 mm. The transition section 115 begins at 50 mm and ends at 70 mm. The transition section 115 and/or 125 is in particular shorter than 25% or 20% of the maximum piston stroke 119.

The second travel distance 114 in particular follows the transition section 115, extending over a length between 40% and 60% of the maximum piston stroke.

FIG. 5 shows for better illustration a variant which may be provided with no apertures 170 at the bottom end of the insert 118. This variant may be operated absent a steel spring 135 and using a gas spring 136 only.

Figure 6:
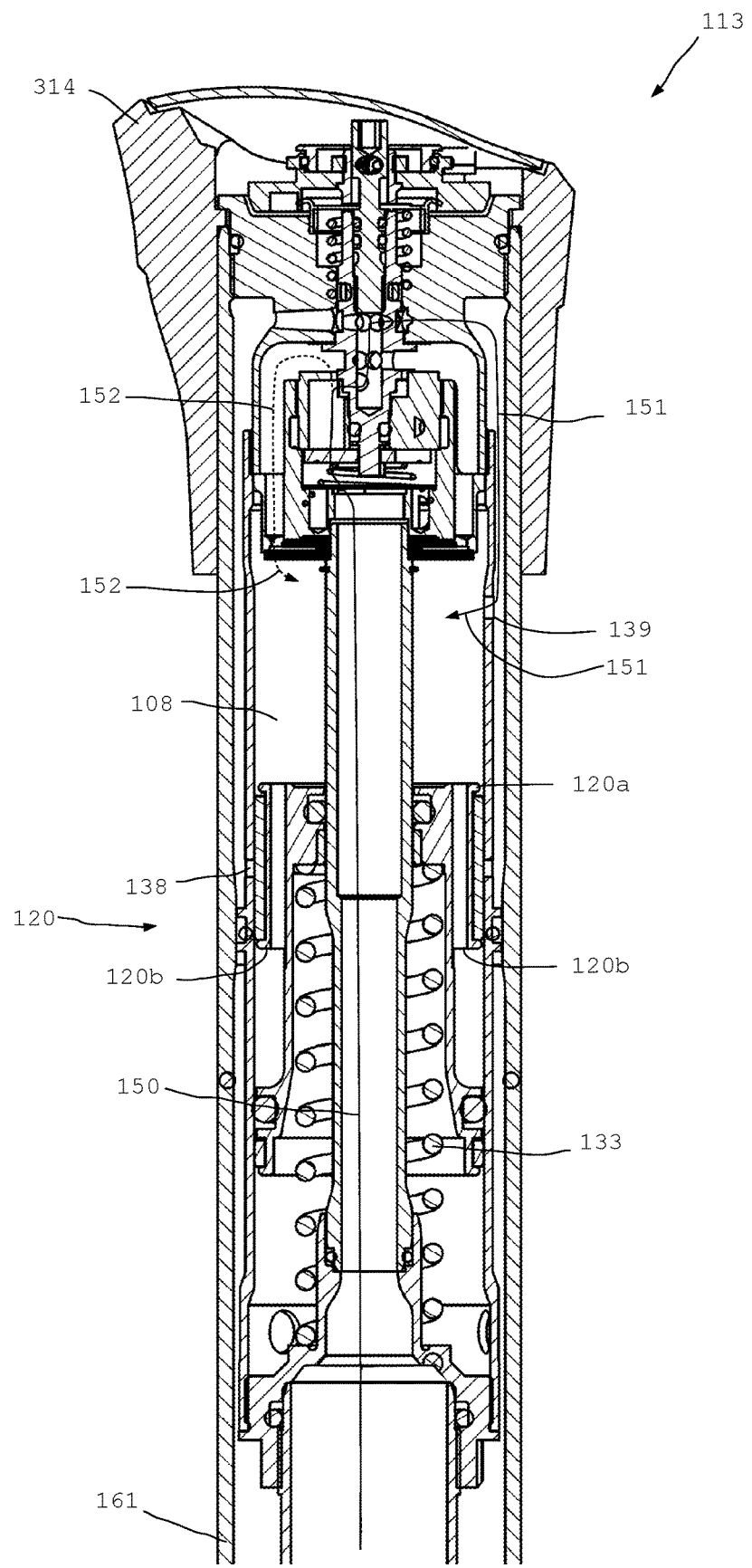
FIG. 6 an enlarged detail of FIG. 3 in another position.

FIG. 6 finally shows a detail similar to the FIGS. 4 and 5 where the suspension fork or the piston 110 is located in the second travel distance 116 and is thus compressed further. In this second travel distance 116, the dividing piston 120 or the bushing 120a is located in the second travel distance 126 and the bushing 120 closes the apertures 138 completely. In this plunged-in position 113, only the flow path 151 through the apertures 139 remains available for weak shocks. In the case of forceful shocks, the flow path 152 will open also.

The damping system 100 of the suspension fork 304 has been illustrated in the FIGS. 2 to 6. With reference to the FIGS. 7 to 12, the suspension system 200 respectively various suspension systems 200 for the suspension fork 304 will now be discussed.

FIG. 7 shows a schematic cross-section of the tube system 260. The tube system 260 comprises a tube 261 being the stanchion tube and a tube 262 being the slider tube. The tubes 261 and 262 are telescopic relative to one another, extending from a first, presently the top, end 263 toward a second, presently the bottom end 264. The top and/or bottom end/s may be provided with adjustment members for the spring characteristics. The top end is provided with an air valve 218 for filling the positive air spring 201.

The volume 204 of the stanchion tube 261 is separated by way of the suspension piston or piston 210 into a positive air spring 201 and a negative spring 202. In the illustrated extended position 211, which may optionally be identical with the base position 111 of the damping system 100 in FIG. 3, the positive air spring 201 comprises a volume 201a and the negative spring 202 comprises a volume 202a.

The piston rod 205 extends from the piston 210 downwardly through the bottom end of the stanchion tube 261 and at the bottom end 264 it is connected with the slider tube 262.

The positive air spring 201 comprises a positive chamber 206 and biases the suspension system 200 to the extended position 211 as illustrated. The negative spring 202 comprises a negative chamber 202 and counteracts the force of the positive air spring 201. This improves the characteristic curve of the suspension system 200.

These kinds of suspension systems 200 in which a positive air spring and optionally also an air spring for a negative spring 202 is/are used, enable suspension forks showing a particularly low weight. Another advantage of using these kinds of gas springs is the fact that adapting the internal pressure enables easy adaptation to the rider's weight. While steel springs require exchanging the effective steel spring for (highly) differing rider's weights, the use of gas springs allows for ease of pressure modification.

The drawback of gas springs is the increased friction due to the required seals. With very weak shocks, the friction between the piston and the inner wall of the stanchion tube and the friction between the piston rod and the lower cap of the stanchion tube may cause the responsivity of a gas spring-operated suspension fork to be less soft than would be desirable.

The suspension fork 304 solves this problem by means of a supplementary spring 208 installed at the lower end of the piston rod 205. The supplementary spring 208 has a spring member 209 that is in particular configured as a coil spring. Basically, such a coil spring shows virtually no friction. The responsivity of the supplementary spring 208 is much softer than that of the positive air spring 201.

The positive air spring 201 and the supplementary spring 208 are series-connected so that in case of weak shocks, the spring which must overcome a lower friction will act first. In this case, this is the supplementary spring 208 (unless it is compressed completely).

The maximum force of the supplementary spring 208 is considerably lower than is the maximum force of the positive air spring 201. Given maximum stroke travel of the supplementary spring 208, the ratio of the spring force of the supplementary spring 208 to the spring force of the positive air spring 201 is in particular lower than 20:10 and higher than 1:10.

The suspension travel of the supplementary spring 208 is likewise considerably shorter than is the suspension travel of the positive air spring 201. In this case, the ratio of the suspension travel of the positive air spring 201 to the suspension travel of the supplementary spring in complete rebound is higher than 4:1. In the exemplary embodiment, the supplementary spring 208 shows suspension travels of 6 mm, 8 mm, 10 mm or 12 mm or 14 mm. The suspension travel of the suspension system 200 overall is preferably at least 100 mm and may be 120 mm, 140 mm or 160 mm or 180 mm, or may show any value in-between or higher. This results in a ratio of the suspension travel of the positive air spring and the supplementary spring 208 of higher than ten and the ratio may reach or exceed a value of 15 or 20. The ratio range of suspension travel of the positive air spring and of the supplementary spring 208 is preferably between 5 and 30.

In many cases, the supplementary spring 208 is already compressed completely in the sag position. The sag position may be set and adjusted for den rider by way of the air pressure and in most cases it will be set to 20% or 25% or 30% of the suspension travel. This means that in a static initial position with the rider sitting quietly on the stationary bicycle, a suspension fork will already be compressed approximately 40 mm given a sag of 25% and suspension travel of 160 mm. For illustrating the principle, the FIG. 7 shows a position in which the supplementary spring 208 is not yet compressed completely. This position may also be given if, following compression of the positive air spring 201 and the supplementary spring 208, both will initially rebound.

The ratio of the stroke length of the positive air spring to the suspension travel of the supplementary spring is in particular higher than the ratio of the volume of the positive chamber to the volume of the negative chamber in the extended position 211. The ratio of the volume of the positive chamber 206 to the volume of the negative chamber in the extended position 211 is in particular higher than 1.6. The region of the supplementary spring 208 of FIG. 7 is shown enlarged in FIG. 8. It can be seen that the supplementary spring 208 is accommodated in a guide housing 221. The guide housing 221 consists of a top housing part 228 and a bottom housing part 223. The guide housing 221 is preferably provided with holes 227 to enable fluid exchange with the inner space of the slider tube 262. The bottom housing part 223 shows a tool engagement point, exemplarily an internal hexagon 224. This allows screwing the bottom housing part 223 to the lower end 262b of the slider tube 262. The supplementary spring 208 may be replaced by a stronger or weaker spring as required. The spring member 209 of the supplementary spring 208 is accommodated in the interior of the guide housing 221. The spring member 209 is configured as a coil spring and is operative between the bottom supporting surface of the bottom housing part 223 and the top support unit 222 which is connected with, for example screwed to, the bottom end of the piston rod 205.

Between the bottom end of the top housing part 221 and the top end of the top support unit 222, a top-out damping 220 may be provided which is for example configured as an elastic ring or rubber ring or the like. An O-ring or a quadring or another suitable type of elastic ring may be used. The top-out damping 220 achieves smooth transition as the supplementary spring 208 reaches the limit of its suspension travel.

In the illustrated extended position 211, the supplementary spring 208 preferably shows a spring force lying in a range between one fourth of the spring force of the positive air spring 201 in the extended position 211 and four times the spring force of the positive air spring 201 in the extended position 211. In preferred configurations, the ratio of the spring force lies between 2:1 and 1:2 and in concrete configurations it may be approximately 1:1.

It is possible for the spring force of the supplementary spring to be the weakest possible in extreme rebound to enable very soft responsivity.

It is particularly preferred for the supplementary spring 208 to show a particularly weak breakaway force. The breakaway force of the supplementary spring 208 is in particular weaker than that of the remaining suspension system and particularly preferably weaker than the breakaway force of the positive air spring 201. Particularly preferably, the breakaway force of the supplementary spring 208 is zero.

A differentiation must be made between the breakaway force and the acting force of the pertaining spring and the suspension system in operation. In normal operation (or with a rider sitting on the bicycle) and with the shock device being in an intermediate position, e.g. in the sag position, the external forces and the forces of the suspension system in a static state are in balance. Since the breakaway force of the supplementary spring 208 is very weak, every minor or minute shock causes spring motion of the suspension system 200, unless the supplementary spring 208 is on block.

Then, a shock of a force weaker than the breakaway force of the positive air spring will only make the supplementary spring compress. The suspension system responds to weak and extremely weak shocks. Shocks showing a force acting on the suspension system 200 that is higher than the breakaway force of the positive air spring will also make the positive air spring 201 move. In all the cases, a soft responsivity is obtained. This applies in particular if the suspension system 200 rebounds, following e.g. a certain shock. Then, the supplementary spring responds immediately by rebounding along unless its maximum force is exceeded.

In a concrete configuration, the spring constant of the supplementary spring 208 is approximately 20 N/mm or 28/mm and the possible stroke length is 8 mm or 10 mm.

The supplementary spring 208 allows a more delicate responsivity of the suspension fork 304, contributing to linearization of the characteristic curve of the suspension fork 304. Even if the supplementary spring 208 shows soft compression the damping system 100 is effective so that even if only the supplementary spring 208 shows spring movement, such movement is damped by means of the damping system 100.

A zero passage of the spring characteristics is obtained since the supplementary spring has no breakaway force. This eliminates impacts on the rider's wrist when hitting the ground such as they are caused by the breakaway force.

Figure 9:
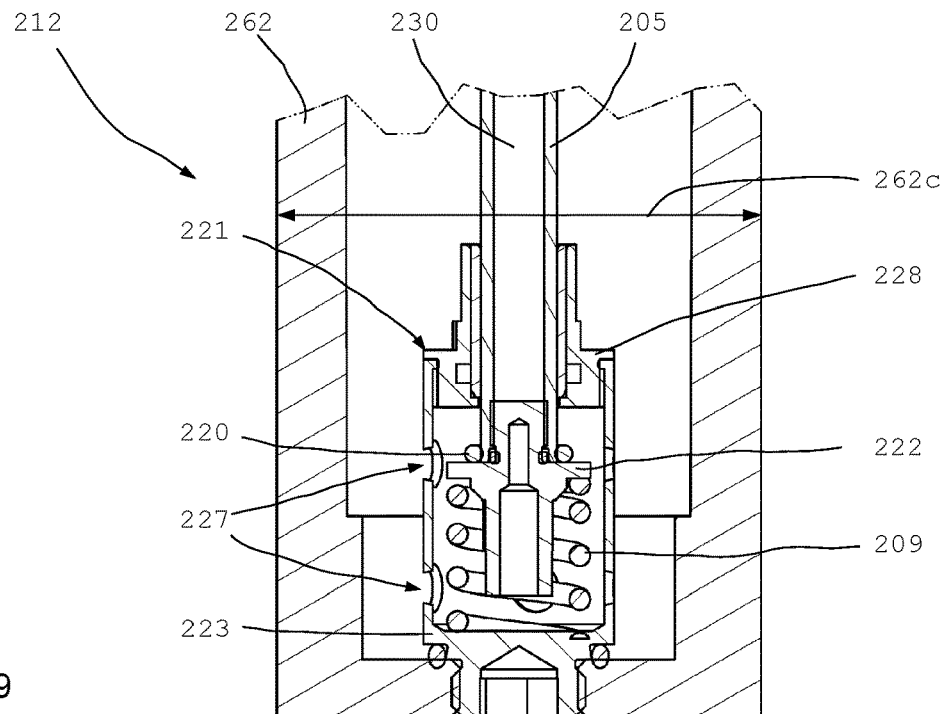
FIG. 9 an illustration according to FIG. 8 in a medium position.
Figure 10:
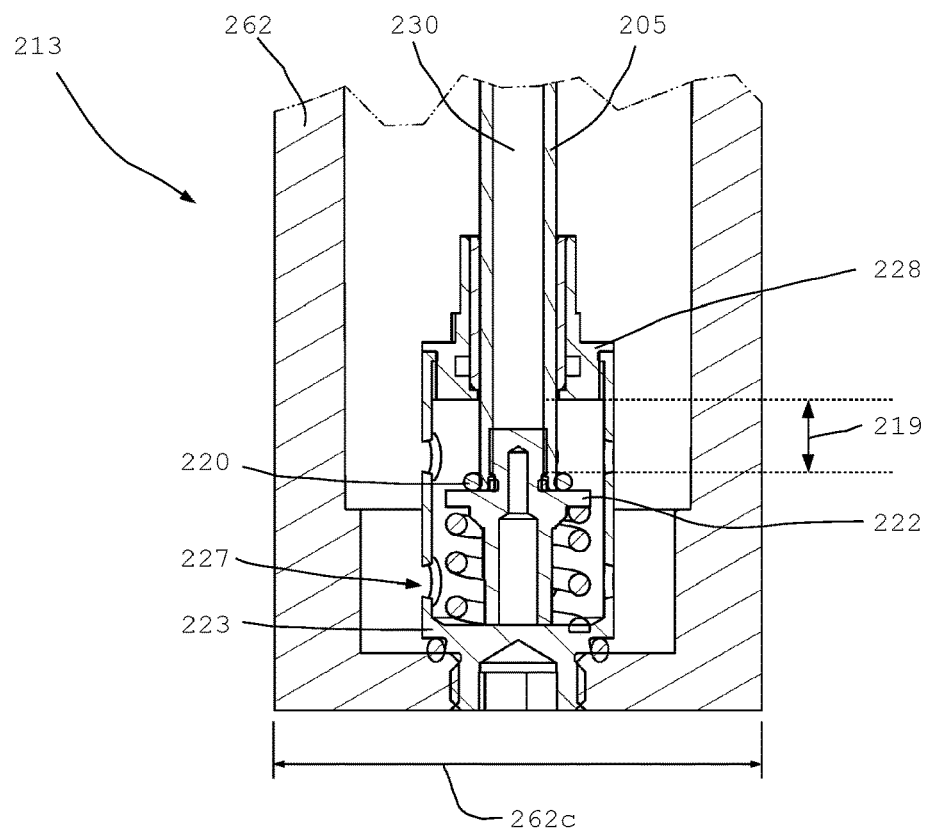
FIG. 10 an illustration according to FIG. 8 in an end position.

FIGS. 9 and 10 show the region of the supplementary spring 208 wherein in FIG. 9 the supplementary spring is in a transition position 212 and in FIG. 10, in the end position 213. The stroke length 219 of the supplementary spring 208 is utilized in full in FIG. 10. The stroke length 219 of the supplementary spring 208 is in particular shorter than the diameters 261c and 262c of the tubes 261 and 262. The inner diameter 261c of the tube 261 preferably lies between 15 and 50 mm and it may be e.g. 24.6 mm. The outer diameter 262c of the tube 262 preferably lies between 20 and 60 mm and it may be e.g. 31.4 mm. The stroke length of the entire suspension system is, however, a multiple (>3 or >4 or >5 or >10 and presently >15) of the stroke length 219. Preferably, the stroke length 219 at least substantially corresponds to the piston stroke 119 and is e.g. approximately 160 mm. Although the stroke length 219 and the piston stroke 119 may differ somewhat due to e.g. manufacturing conditions, they are preferably (at least nearly) identical.

By way of the supplementary spring 208, better responsivity may be achieved as compressing begins or while the supplementary spring 208 is not on block. The spring force and the stroke length 219 of the supplementary spring 208 may be dimensioned such that even in the sag position the available stroke length for the supplementary spring 208 is still considerable so that the supplementary spring 208 is for example in the position illustrated in FIG. 9 when in the sag position.

However, it is likewise preferred for the supplementary spring 208 to be compressed completely in the sag position in the static state of rest. In real riding operation, the shock device returns to rebound following a shock. Then e.g., in jumps or brief loss of ground contact the supplementary spring 208 also rebounds so that the supplementary spring 208 may compress (shortly) after rebounding.

FIG. 11 shows another configuration of a suspension system 200. This suspension system 200 is in turn accommodated in the stanchion tube 261 of the tube system 260. The suspension system 200 according to FIG. 11 may, as does the suspension system 200 according to FIG. 7, comprise a mechanical supplementary spring 208 at the bottom end of the piston rod 205. The corresponding bottom region of the piston rod is preferably configured in analogy to the FIGS. 7 to 10.

This suspension system 200 comprises a positive air spring 201 having a positive chamber 206 above the piston 210. The negative spring 202 having a negative chamber 207 is disposed between the bottom end of the piston 210 and the bottom cap of the stanchion tube 261.

The piston 210 runs within a cylinder device 203 that is inserted in the interior of the stanchion tube 261. This cylinder device 203 is configured open on top so that the hollow space 231 surrounding the cylinder device 203 provides, between the cylinder device and the inner wall of the stanchion tube 261, an additional hollow space 231 contributing to the volume of the positive air spring 201. A seal 239 is provided in an axial position in the hollow space between the cylinder device 203 and the stanchion tube 261. The seal 239 separates the top region including the additional hollow space 231 from a bottom region including another hollow space 232. While the additional hollow space 231 communicates with the positive chamber 206, the further hollow space 232 communicates with the negative chamber 207 via flow apertures 234. The additional hollow space 231 communicates with the positive chamber 206 via a flow aperture 233 in the shape of an annular gap.

The additional hollow space 231 and the further hollow space 232 each enlarge the volume 201a available to the positive air spring 201 and the volume 202a available to the negative spring 202, by the additional hollow space 231 respectively the further hollow space 232. Expressed reversely, the surface on which the piston 210 acts in compressing and rebounding is reduced.

The enlarged volume 201a of the positive air spring 201 and the enlarged volume 202a of the negative spring 202 achieve a reduced progression in compressing and rebounding. In this way, the characteristic curve of the suspension fork is linearized. The ratio of the volume 201a to the piston diameter 210a is enlarged over a conventional suspension system showing the same outer dimensions. This means that both the progression of the positive air spring and also the progression of the negative air spring are reduced so as to provide a characteristic curve showing increased linearity overall.

Furthermore, it is possible to connect for example the negative chamber 207 with the inner space of the piston rod 205 via a flow aperture 235. Then, the inner space of the piston rod 205 serves as a (further) supplementary hollow space 230 for the negative spring.

Depending on the structure, it is also possible to connect the inner space 230 of the piston rod 205 with the positive chamber 206, separating it from the negative chamber 207. To this end for example, a longitudinal bore through the piston 210 may be made for connecting the positive chamber 206 with the supplementary hollow space 230. Accordingly, the flow aperture 235 is then closed.

The reference numeral 238 denotes a connection member for connecting the piston 210 with the piston rod 205.

The bypass 225 illustrated in the FIG. 11 somewhat above the piston 210 connects the positive chamber 206 with the negative chamber 207, while the piston 210 respectively the seal of the piston 210 is located level with the bypass 225. This enables pressure exchange between the positive chamber 206 and the negative chamber 207 in this position. Thus, automatic pressure exchange between the positive chamber 206 and the negative chamber 207 takes place every time the piston 210 is in the proper position.

The slider tube 262 is guided via guide bushings 237 on the stanchion tube 261. The void 236 beneath the guide bushing 237 serves to reduce friction.

FIG. 12 shows an enlarged detail from FIG. 11 in which the aperture 234 and the bypass 225 can be better seen.

On the whole, the suspension fork provides an advantageous system which enables softer damping and softer cushioning in a first suspension travel section. Damping is varied in relation to the travel length. While damping is greatly reduced over a first travel portion only, damping will be decreased to normal for example after one third or 40% of the suspension travel length.

In cushioning, the supplementary spring 208 likewise enables softer responsivity. This achieves better damping for minor shocks and ground unevennesses. Increasing the ratio of spring volume to piston surface allows to obtain an even further improved linearization of the spring characteristics.

The suspension system 200 allows to linearize the typical waveform of a characteristic air spring curve.

In general, it is significant for the present application to bear in mind that during riding, the front wheel of a bicycle tends to frequently lose ground contact. Then, the suspension fork will rebound (completely) every time, and thus the supplementary spring will be employed even if the supplementary spring 208 is already on block in the static sag position.

Air suspension systems provide for seals at the piston and the piston rod for generating friction. The breakaway force or static friction (the force required for generating movement) is particularly undesirable if soft response of a shock device configured e.g. as a suspension fork is intended.

The supplementary spring 208 in the piston rod allows movement of the suspension fork already prior to reaching or exceeding the breakaway force (frictional force). Measurements performed in a concrete example showed a breakaway force of 20N.

Strictly speaking, an air suspension system per se does not show spring characteristics (force path illustrated by way of the suspension travel) running through the origin point of the coordinate system where the suspension travel and the force are both zero. This is due to the breakaway force to be overcome for a shock device to compress. A shock device 1 equipped with a supplementary spring 208, however, allows immediate movement of the shock device 1 (e.g. a suspension fork), even if the positive air spring per se begins moving with a force higher than or equal to 28 N (or e.g. 20 N, depending on the configuration). The supplementary spring 208 allows direct cushioning every time the wheel hits the ground. Absent this supplementary spring 208, an impact of 20N might be transmitted unsprung into the rider's hands. The spring characteristics travel through the zero point.

A suspension system 200 shows a more linear characteristic curve and has considerable advantages. The suspension system 200 offers soft responsivity because in the first region (or until the curves of the positive air spring and the supplementary spring meet) of the suspension travel less force is required for riding over the same obstacle or for covering the same suspension travel.

An improved supporting effect is achieved in the middle region of suspension travel because suspension travel shows increased linearity overall.

Basically, a steel spring shows more linearity than does a conventional air suspension system having a positive air spring and a negative air spring. In a conventional air suspension system showing the same force increase, the conventional air suspension system travels over a clearly longer distance than does a linear steel spring. In conventional air suspension systems, this may cause the suspension fork to plunge in situations where the suspension fork is already slightly compressed, such as during braking in a downhill ride with obstacles on the ground. This will leave relatively little suspension travel which may cause the rider to feel less than secure because the load shifts still further forwardly and little suspension travel buffer remains for unexpected events. The shock device 1 presently introduced offers better predictability of behavior and thus a safer feeling for the rider.

For better linearization of the characteristic curve of the suspension system 200, the shock device 1 preferably provides for increased volume of both the air chambers (positive air chamber and negative chamber) over the prior art or for reduced piston diameters relative to the volume of the air chambers. This achieves lower progression at two ends of the suspension travel and reduces a typical "wave" or reversed "S shape" of the air suspension.

It is advantageous that the supplementary spring 208 is series-connected with the air suspension (positive air spring and negative spring) which acts in a first range of the suspension travel. In the exemplary embodiment, the supplementary spring 208 acts until the force of the supplementary spring 208 acting on the suspension fork 224 reaches Newton (N).

A comparison of two suspension forks having the same settings (one conventional without a supplementary spring and one shock device 1 with a supplementary spring 208) against e.g. identical sag of 25% clearly shows that in front of the sag position the responsivity is softer because the force path over the suspension travel runs beneath the curve of the conventional suspension fork. Above the sag position (in longer suspension travel), the curve is clearly more linear and thus better to estimate or calculate for the rider. The supplementary spring makes the suspension system more sensitive and effective even with very weak forces, while a conventional air suspension system first needs to overcome a breakaway force which is not negligible. Traction is improved.

While a particular embodiment of the present shock device has been described herein, it will be appreciated by those skilled in the art that changes and modifications may be made thereto without departing from the invention in its broader aspects and as set forth in the following claims.

| List of reference numerals: | |
|---|---|
| 1 | shock device, shock absorber |
| 60 | tube system |
| 65 | wheel receiving space |
| 100 | damping system |
| 103 | damper cylinder |
| 104 | damping volume |
| 105 | piston rod |
| 106 | first damping chamber |
| 107 | second damping chamber |
| 108 | auxiliary chamber |
| 108a | chamber section of 108 |
| 109 | damping fluid |
| 110 | piston |
| 111 | base position, initial position |
| 112 | transition position |

-continued

| List of reference numerals: | |
|---|---|
| 113 | plunged-in position |
| 114 | first travel distance |
| 115 | transition section |
| 116 | second travel distance |
| 118 | insert |
| 118a | bottom end |
| 118b | top end |
| 119 | piston stroke |
| 120 | dividing piston |
| 120a | bushing |
| 120b | bottom end of 120a |
| 120c | bottom end of 120 |
| 121 | base position, initial position |
| 122 | transition position |
| 123 | plunged-in position |
| 124 | first travel distance |
| 125 | transition section |
| 126 | further plunged-in travel distance |
| 129 | piston stroke |
| 132 | throttle unit |
| 133 | biasing device |
| 134 | equalizing volume |
| 135 | steel spring |
| 136 | gas spring |
| 137 | valve |
| 138 | aperture of 137 |
| 139 | aperture |
| 140 | throttle low speed |
| 141 | first duct |
| 142 | second duct |
| 143 | return duct |
| 145 | throttle high speed |
| 146 | control insert |
| 150 | flow path |
| 151 | flow path |
| 152 | flow path |
| 153 | flow path |
| 154 | radial gap |
| 160 | tube system |
| 161 | stanchion tube |
| 162 | slider tube |
| 166 | bottom connector |
| 167 | hollow space at 161 |
| 168 | operating member |
| 169 | hollow space at 161 |
| 170 | aperture |
| 171 | shim |
| 173 | shim |
| 174 | seal |
| 175 | seal |
| 200 | suspension system |
| 201 | positive air spring |
| 201a | volume of 201 |
| 202 | negative spring |
| 202a | volume of 202 |
| 203 | cylinder device |
| 204 | volume (in 261) |
| 205 | piston rod |
| 206 | positive chamber |
| 207 | negative chamber |
| 208 | supplementary spring |
| 209 | spring member, coil spring |
| 210 | piston |
| 210a | diameter of 210 |
| 211 | extended position base position |
| 212 | transition position |
| 213 | plunged-in position end position |
| 218 | air valve for 201 |
| 219 | stroke length of 208 |
| 220 | top-out damping |
| 221 | guide housing |
| 222 | (top) support unit |
| 223 | (bottom) housing part of 221 |
| 224 | internal hexagon |
| 225 | bypass |
| 227 | hole in 221 |
| 228 | (top) housing part of 221 |

-continued

| | List of reference numerals: |
|---|---|
| 230 | supplementary hollow space (inner space of 205) |
| 231 | additional hollow space for 201 |
| 232 | further hollow space for 202 |
| 233 | flow aperture for 231 |
| 234 | flow aperture for 232 |
| 235 | flow aperture for 230 |
| 236 | void |
| 237 | guide bushing |
| 238 | connection members 205 + 210 |
| 239 | seal between 231 + 232 |
| 251 | air volume |
| 252 | air volume |
| 260 | tube system |
| 261 | tube, stanchion tube |
| 261a | 1st end of 261 |
| 261b | 2nd end of 261 |
| 261c | diameter |
| 262 | tube, slider tube |
| 262a | 1st end of 262 |
| 262b | 2nd end of 262 |
| 262c | diameter |
| 263 | 1st end |
| 264 | 2nd end |
| 300 | two-wheeled vehicle, bicycle |
| 301 | wheel, front wheel |
| 302 | wheel, rear wheel |
| 303 | frame |
| 304 | suspension fork |
| 305 | damper |
| 306 | handlebar |
| 307 | saddle |
| 308 | hub |
| 309 | spoke |
| 310 | rim |
| 311 | disk brake |
| 312 | drive |
| 314 | fork crown |
| 315 | fork column |
| 316 | dropout |
| 317 | lower unit (lower) |
| 318 | top unit |

The invention claimed is:

1. A shock device for an at least partially muscle-powered two-wheeled vehicle, the shock device comprising:
at least one tube system having two telescopic tubes, the tube system extending from a first end to a second end; and
a suspension system which is effective between the first end and the second end and biases the two tubes to an extended position,
wherein the suspension system comprises a positive air spring and an independent, series-connected supplementary spring, wherein the supplementary spring comprises a top-out damping, and wherein both the positive air spring and the supplementary spring bias the tube system to the extended position; and
the supplementary spring shows a lower breakaway force than does the positive air spring and the ratio of the suspension travel of the positive air spring to the suspension travel of the supplementary spring is higher than 4:1.

2. The shock device according to claim 1 configured as a suspension fork, wherein one of the two tubes is configured as a stanchion tube and the other of the two tubes is configured as a slider tube.

3. The shock device according to claim 2, wherein the stanchion tube is connected with a fork crown or a fork column and the slider tube is connected with a dropout.

4. The shock device according to claim 1, wherein the positive air spring comprises a positive chamber in a first tube of the two tubes.

5. The shock device according to claim 4, wherein the positive chamber is enclosed by a moving piston connected with a piston rod and wherein the piston rod is coupled with a second tube of the two tubes.

6. The shock device according to claim 5, wherein the supplementary spring is disposed between the piston rod and the second tube.

7. The shock device according to claim 1, wherein the supplementary spring shows linear spring characteristics.

8. The shock device according to claim 1, wherein the supplementary spring comprises at least one metallic spring member such as a coil spring.

9. The shock device according to claim 1, wherein the stroke length of the supplementary spring is shorter than the diameter of at least one of the tubes of the tube system.

10. The shock device according to claim 1, wherein the ratio of the spring force of the supplementary spring to the spring force of the positive air spring in the case of the maximum stroke length of the supplementary spring is lower than 20:10 and higher than 1:10.

11. The shock device according to claim 1, wherein the ratio of the spring force of the supplementary spring to the spring force of the positive air spring in an extended position or a sag position is lower than 4:1 and higher than 1:4.

12. The shock device according to claim 1, wherein the positive air spring includes a positive chamber and a negative spring, which is configured in the first tube to exert a force counteracting the positive air spring, includes a negative chamber, and wherein the ratio of the stroke length of the positive air spring to the suspension travel of the supplementary spring is higher than the ratio of the volume of the positive chamber to the volume of the negative chamber in the extended position.

13. The shock device according to claim 12, wherein the ratio of the volume of the positive chamber to the volume of the negative chamber in the extended position is higher than 1.5.

14. The shock device according to claim 1, wherein the supplementary spring is exchangeable or adjustable.

15. The shock device according to claim 1, wherein the supplementary spring is accommodated in a guide housing which is exchangeable or adjustable.

16. The shock device according to claim 1, wherein a negative spring is configured in the first tube exerting a force counteracting the positive air spring.

17. The shock device according to claim 16, wherein the negative spring is configured as an air spring and wherein a moving piston variably divides the volume in the first tube into a negative volume of the negative spring and a positive volume of the positive spring.

18. The shock device according to claim 16, wherein a bypass is provided which ensures pressure compensation between the positive air spring and the negative spring in a predetermined piston position.

19. The shock device according to claim further comprising a damping system.

20. The shock device according to claim 19, wherein at least part of the damping system is disposed in a second tube system.

21. The shock device according to claim 1, wherein the first tube of the two tubes receives a cylinder device in which the piston is movably accommodated.

22. The shock device according to claim 21, wherein the cylinder device is at least in sections surrounded by an additional hollow space which contributes to the volume of a positive air chamber of the positive air spring as does the volume of a positive chamber of the cylinder device.

23. The shock device according to claim 21, wherein the cylinder device is at least in sections surrounded by a further hollow space which contributes to the volume of a negative air chamber of a negative spring as does the volume of a negative chamber of the cylinder device.

24. The shock device according to claim 23, wherein the cylinder device is firmly connected with the first tube and comprises flow apertures toward the additional hollow space and toward the further hollow space.

25. The shock device according to claim 24, wherein the additional hollow space and the further hollow space are axially adjacent and are separated from one another by a seal.

26. A shock device for an at least partially muscle-powered two-wheeled vehicle, the shock device comprising:
at least one tube system having two telescopic tubes, the tube system extending from a first end to a second end; and
a suspension system which is effective between the first end and the second end and biases the two tubes to an extended position;
wherein the suspension system comprises a positive air spring and an independent, series-connected supplementary spring, and wherein both the positive air spring and the supplementary spring bias the tube system to the extended position; and
the supplementary spring shows a lower breakaway force than does the positive air spring and that the ratio of the suspension travel of the positive air spring to the suspension travel of the supplementary spring is higher than 4:1,
wherein the ratio of the spring force of the supplementary spring to the spring force of the positive air spring in the case of a maximum stroke length of the supplementary spring is lower than 20:10 and higher than 1:10.

27. A shock device for an at least partially muscle-powered two-wheeled vehicle, the shock device comprising:
at least one tube system having two telescopic tubes, the tube system extending from a first end to a second end; and
a suspension system is provided which is effective between the first end and the second end and biases the two tubes to an extended position,
wherein the suspension system comprises a positive air spring and an independent, series-connected supplementary spring, and wherein both the positive air spring and the supplementary spring bias the tube system to the extended position; and
the supplementary spring shows a lower breakaway force than does the positive air spring and that the ratio of the suspension travel of the positive air spring to the suspension travel of the supplementary spring is higher than 4:1,
wherein the ratio of the spring force of the supplementary spring to the spring force of the positive air spring in an extended position or a sag position is lower than 4:1 and higher than 1.4.

28. A shock device for an at least partially muscle-powered two-wheeled vehicle, the shock device comprising:
at least one tube system having two telescopic tubes, the tube system extending from a first end to a second end; and
a suspension system which is effective between the first end and the second end and biases the two tubes to an extended position,
wherein the suspension system comprises a positive air spring and an independent, series-connected supplementary spring, and wherein both the positive air spring and the supplementary spring bias the tube system to the extended position,
wherein the positive air spring comprises a positive chamber in a first tube of the two tubes, the positive chamber being enclosed by a moving piston connected with a piston rod and wherein the piston rod is coupled with a second tube of the two tubes,
wherein a negative spring is configured in the first tube and comprises a negative chamber and exerts a force counteracting the positive air spring, wherein the negative spring is configured as an air spring and wherein the moving piston variably divides the volume in the first tube into a negative volume of the negative spring and a positive volume of the positive spring; and
the supplementary spring shows a lower breakaway force than does the positive air spring and the ratio of the suspension travel of the positive air spring to the suspension travel of the supplementary spring is higher than 4:1,
wherein the ratio of a stroke length of the positive air spring to a suspension travel of the supplementary spring is higher than the ratio of the volume of the positive chamber to the volume of the negative chamber in the extended position.

29. A shock device for an at least partially muscle-powered two-wheeled vehicle, the shock device comprising:
at least one tube system having two telescopic tubes, the tube system extending from a first end to a second end;
a suspension system which is effective between the first end and the second end and biases the two tubes to an extended position;
wherein the suspension system comprises a positive air spring and an independent, series-connected supplementary spring, and wherein both the positive air spring and the supplementary spring bias the tube system to the extended position,
wherein the positive air spring comprises a positive chamber in a first tube of the two tubes, the positive chamber being enclosed by a moving piston connected with a piston rod and wherein the piston rod is coupled with a second tube of the two tubes,
wherein a negative spring is configured in the first tube and comprises a negative chamber and exerts a force counteracting the positive air spring, wherein the negative spring is configured as an air spring and wherein the moving piston variably divides the volume in the first tube into a negative volume of the negative spring and a positive volume of the positive spring; and
the supplementary spring shows a lower breakaway force than does the positive air spring and the ratio of the suspension travel of the positive air spring to the suspension travel of the supplementary spring is higher than 4:1,
wherein the ratio of the volume of the positive chamber to the volume of the negative chamber in the extended position is higher than 1.5.

30. A shock device for an at least partially muscle-powered two-wheeled vehicle, the shock device comprising:
at least one tube system having two telescopic tubes, the tube system extending from a first end to a second end;

a suspension system which is effective between the first end and the second end and biases the two tubes to an extended position;

wherein the suspension system comprises a positive air spring and an independent, series-connected supplementary spring, and wherein both the positive air spring and the supplementary spring bias the tube system to the extended position, wherein the positive air spring comprises a positive chamber in a first tube of the two tubes, the positive chamber being enclosed by a moving piston connected with a piston rod and wherein the piston rod is coupled with a second tube of the two tubes, wherein a negative spring is configured in the first tube and exerts a force counteracting the positive air spring, wherein the negative spring is configured as an air spring and wherein the moving piston variably divides the volume in the first tube into a negative volume of the negative spring and a positive volume of the positive spring, and the supplementary spring shows a lower breakaway force than does the positive air spring and the ratio of the suspension travel of the positive air spring to the suspension travel of the supplementary spring is higher than 4:1, wherein a bypass is provided which ensures pressure compensation between the positive air spring and the negative spring in a predetermined piston position.

* * * * *